(12) United States Patent
Zhang et al.

(10) Patent No.: US 7,216,200 B2
(45) Date of Patent: May 8, 2007

(54) SYSTEM AND METHOD FOR REMOTE RAID CONFIGURATION

(75) Inventors: Weijia Zhang, Round Rock, TX (US); Yiqing Lai, Round Rock, TX (US); Anusha Ragunathan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 491 days.

(21) Appl. No.: 10/700,709

(22) Filed: Nov. 4, 2003

(65) Prior Publication Data

US 2005/0108474 A1    May 19, 2005

(51) Int. Cl.
  *G06F 12/00* (2006.01)
(52) U.S. Cl. ............... 711/114; 711/170; 713/1; 713/2
(58) Field of Classification Search ........... 711/114, 711/112; 713/1, 2; 709/223
  See application file for complete search history.

(56) References Cited

U.S. PATENT DOCUMENTS

| | | | | |
|---|---|---|---|---|
| 5,155,857 A | * | 10/1992 | Kunisaki et al. | 709/223 |
| 5,768,586 A | * | 6/1998 | Zweben et al. | 713/100 |
| 6,108,697 A | | 8/2000 | Raymond et al. | 709/218 |
| 6,144,992 A | | 11/2000 | Turpin et al. | 709/208 |
| 6,519,679 B2 | | 2/2003 | Devireddy et al. | 711/114 |
| 6,584,499 B1 | | 6/2003 | Jantz et al. | 709/220 |
| 6,684,327 B1 | * | 1/2004 | Anand et al. | 713/2 |
| 2002/0087868 A1 | * | 7/2002 | King et al. | 713/185 |
| 2002/0178380 A1 | * | 11/2002 | Wolf et al. | 713/201 |
| 2003/0055919 A1 | * | 3/2003 | Fong et al. | 709/220 |
| 2003/0187997 A1 | * | 10/2003 | Alexis | 709/229 |
| 2003/0208587 A1 | * | 11/2003 | Sauer | 709/223 |
| 2005/0071619 A1 | * | 3/2005 | Chu et al. | 713/2 |
| 2005/0097310 A1 | * | 5/2005 | Chu et al. | 713/2 |
| 2005/0108474 A1 | * | 5/2005 | Zhang et al. | 711/114 |
| 2005/0149716 A1 | * | 7/2005 | Nair et al. | 713/1 |

FOREIGN PATENT DOCUMENTS

| | | | | |
|---|---|---|---|---|
| EP | 1283464 A | * | 3/2006 | |
| JP | 20020169694 | * | 6/2002 | |

* cited by examiner

*Primary Examiner*—Pierre-Michel Bataille
(74) *Attorney, Agent, or Firm*—Hamilton & Terrile, LLP; Robert W. Holland

(57) ABSTRACT

A deployment module of a RAID deployment management system integrates vendor-specific RAID configurations into a vendor-independent infrastructure with a RAID configuration utility that translates vendor-specific formatted configuration information to vendor-independent formatted configuration information. A user interface determines a RAID configuration for a target information handling system from a unique identifier associated with the target information handling system and deploys the configuration information through a deployment engine that selects a boot file from a DHCP server for the target to boot to with a PXE client. The deployment engine loads an agent to the target that executes to configure the target and then resets the boot file associated with the target so that subsequent boot allows the configured target to deploy software.

14 Claims, 3 Drawing Sheets

SYSTEM AND METHOD FOR REMOTE RAID CONFIGURATION

BACKGROUND OF THE INVENTION

1. Field of the Invention

The present invention relates to the field of configuring information handling systems, and more particularly to a system and method for remote configuration of RAID information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Although the wide variety of hardware and software configurations available for information handling systems provides consumers with great flexibility to meet desired information processing needs, the proper configuration of these various types of information handling systems by manufacturers often presents a complex task. In the information handling system client sector, manufacturers typically rely on image-based deployment products to ensure proper configuration of information handling systems. Image-based deployments copy an image of properly configured operating system and application software to permanent memory of an information handling system, such as a hard disc drive, so that the information handling system operates correctly when initially powered up without the delays generally associated with software configuration. However, image-based software deployment to servers is less mature than with clients, particularly with specialized servers, such as RAID (Redundant Array of Inexpensive Disks) information handling systems.

RAID information handling systems are generally configured in different types of RAID implementations that are each enabled with a variety of hardware and software component configurations. Successful imaging of a RAID drive is dependent on the specific computer model, driver controller, hard drive and RAID implementation so that preparation and loading of a particular configuration on a RAID server information handling system is generally performed at a RAID server using vendor-specific deployment products. Local deployment of RAID configurations with vendor specific applications generally restricts incorporation of manufacture of RAID servers with other types of information handling systems. For instance, due to the complexity of RAID deployment utilities and the variety of hardware generally used for RAID drives, deployment software vendors typically do not integrate RAID utilities into their deployment applications, instead generally providing a hook to third party components to implement RAID features or assuming that target systems are in a desired RAID configuration before software deployment. One example is a deployment application which configures RAID drives with scripts. Another example is an application which implements code that allows users to write RAID modules on a management server that, in turn, downloads the modules to a target RAID server to perform a RAID configuration task for each module. These types of vendor specific deployment applications fail to provide a seamless solution to integrate RAID configuration tools to a deployment environment.

SUMMARY OF THE INVENTION

Therefore a need has arisen for a system and method which remotely configures RAID information handling systems having plural configuration types.

In accordance with the present invention, a method and system are provided which substantially reduce the disadvantages and problems associated with previous methods and systems for configuration of RAID information handling systems. A deployment module deploys vendor-specific configuration utilities from a management platform through translation to a vendor-independent format and controlled distribution of boot files by RAID information handling system type.

More specifically, a deployment module deploys configuration information from a user interface to a target RAID information handling system to configure the target with vendor specific utilities through a vendor-independent infrastructure. A request for RAID configuration of a target information handling system populates the target with utilities and settings by directing a PXE boot of the target to a selected boot file of a DHCP server. The initial boot runs a deployment operating system that accepts RAID configuration information, such as vendor-specific utilities and settings, from a RAID configuration utility. A configuration agent on the target information handling system runs the vendor specific utilities to configure the target and returns status information to the deployment module. The RAID configuration utility translates the status information to a vendor independent format for display at the user interface. The deployment engine resets the boot file of the DHCP server associated with the target so that subsequent reboot of the target loads a primary boot file to manage software deployment to the target. Boot file selection from plural available boot files of the DHCP server is determined by reference of the deployment engine to a status label of the target information handling system.

The present invention provides a number of important technical advantages. One example of an important technical advantage is that RAID information handling systems are remotely configured independent of hardware and software configuration type. Manufacture of information handling systems with a software deployment system infrastructure that includes remote RAID configuration provides a unified approach to software deployment. Incorporation of RAID server manufacturing in an automated information handling system manufacturing environment is thus enabled with remote deployment for RAID configuration supported by manufacturing equipment used with remote deployment for other types of information handling system configurations. Deployment to RAID information handling systems is supported from the deployment of bare systems that lack an operating system and ability to run applications to the deployment of systems having local and final operating systems that are able to run deployment applications.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Remote RAID information handling system configuration is embedded in a deployment infrastructure to unify configuration and software deployment to storage server information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
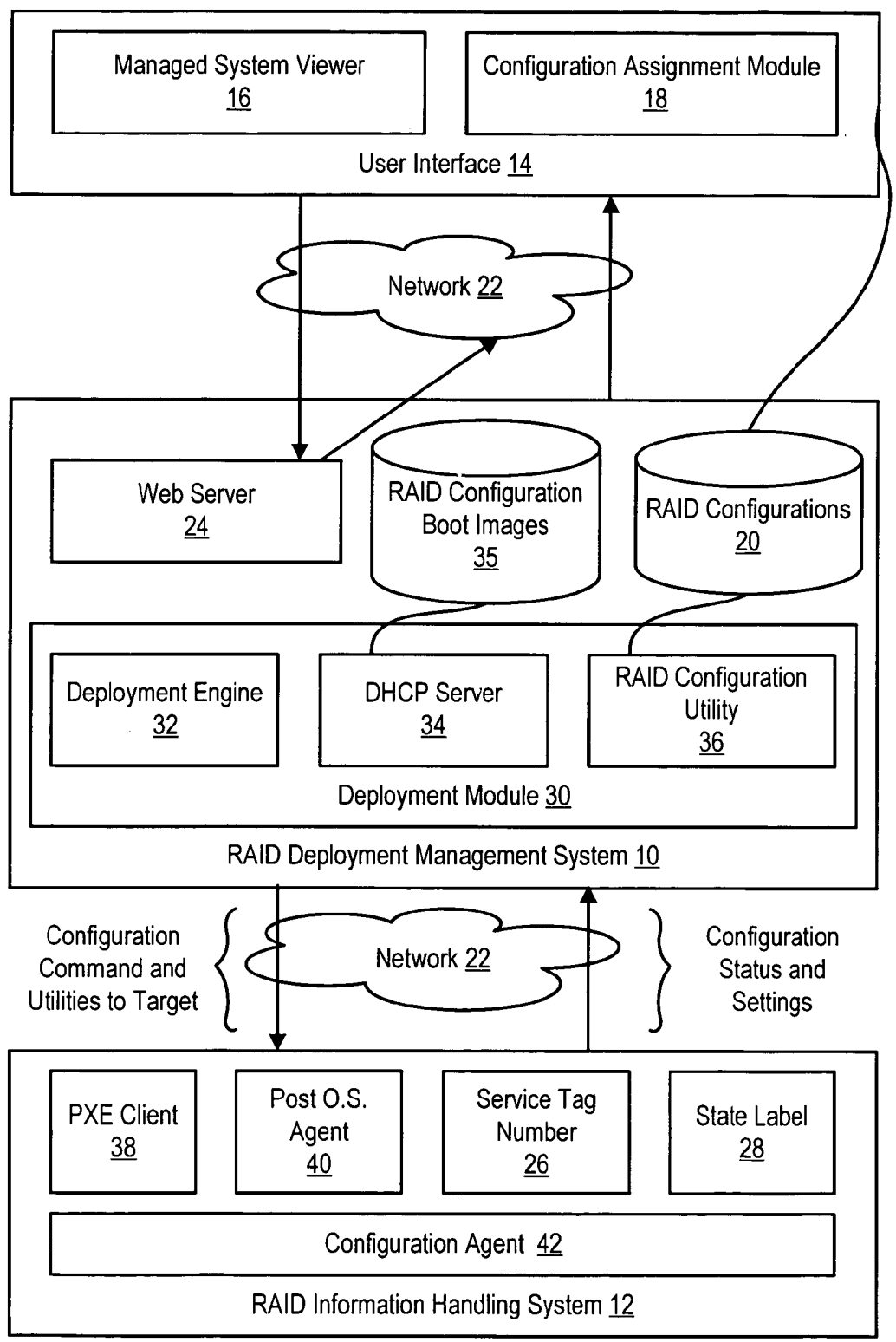
FIG. 1 depicts a block diagram of a RAID deployment management system.

Referring now to FIG. 1, a block diagram depicts a RAID deployment management system 10 that embeds in an information handling system manufacturing infrastructure, such as factory software deployment network, for unified configuration and software deployment to a target RAID information handling system 12. A user interface 14 allows users to view managed target information handling systems 12 with managed system viewer 16 and to selectively assign configurations with configuration assignment module 18 from available configurations in RAID configurations database 20. User interface 14 interacts with target RAID information handling system 12 as a browser that communicates through a network 22 to a web server 24. Deployment module 30 identifies a target RAID information handling system by a unique identifier, such as a service tag number 26 having a configuration of physical components stored in RAID configuration database 20. In addition, deployment module 30 identifies a configuration state of target RAID information handling system 12 from a state label 28 that provides status information to management system 10. For instance, the state label may be information indicative of a bare state that lacks an operating system load, a local operating system state without a post operating system agent, and a local operating system state with a post operating system agent.

Configuration assignment module 18 passes an assigned RAID configuration for a target 12 as a RAID configuration request through web server 24 to a deployment module 30 based upon the status label 28 and unique identifier 26. Deployment module 30 has a deployment engine 32 that dispatches a desired configuration to target 12, a DHCP server 34 that supports PXE boots of target 12 and a RAID configuration utility 36 that supports vendor specific RAID implementations. Configuration command and utilities are dispatched from deployment engine 32 to target 12 to initiate configuration of target 12 from the current state by a selected RAID configuration implementation. After configuration by a vendor specific RAID implementation, configuration status and settings from target 12 are translated through RAID configuration utility 36 and provided to user interface 14. A RAID configuration boot images database 35 stores boot files with each boot file supporting one or more predetermined RAID information handling system configurations. Raid configurations database 20 stores vendor-specific utilities with each utility supporting configuration of one or more predetermined RAID configurations by vendor type.

Deployment engine 32 is a persistent program that determines the status of target 12 from state label 28 and uses the status information to dispatch an appropriate RAID configuration and initiate a boot setting change for target 12 if needed. For instance, deployment engine 32 accepts configuration assignments from user interface 14 through web server 24 and passes tasks to target 12, such as configuration commands and utilities performed through a PXE client boot file. On reboot of target 12, PXE client 38 uses the boot setting from deployment engine 30 to boot from DHCP server 34 and download a selected RAID configuration and operating system carrier from RAID configuration utility 36. Upon completion of RAID configuration for target 12, the target may initiate software deployment or reboot to its initial state. In an alternative embodiment that is not powered up in a network, the configuration may be set in advance so that target 12 is RAID configured automatically upon booting up.

Management of RAID configuration and subsequent software deployment is performed through coordination of PXE client 38, post operating system agent 40, DHCP server 34 and RAID configuration utility 36. Post operating system agent 40 boots to run a vendor-specific RAID utility on target 12 as determined by deployment engine 32. RAID configuration utility 36 translates RAID configuration settings and commands to a vendor-independent format to support communication by RAID deployment management system 10 with plural types of RAID target information handling systems 12. RAID configuration utilities may reside in one or more boot files with DHCP server 34 switching boot file settings according to the target system selected by user interface 14. In one alternative embodiment, a light weight configuration agent 42 provides reboot commands to trigger RAID configuration utilities at a target information handling system.

Figure 2:
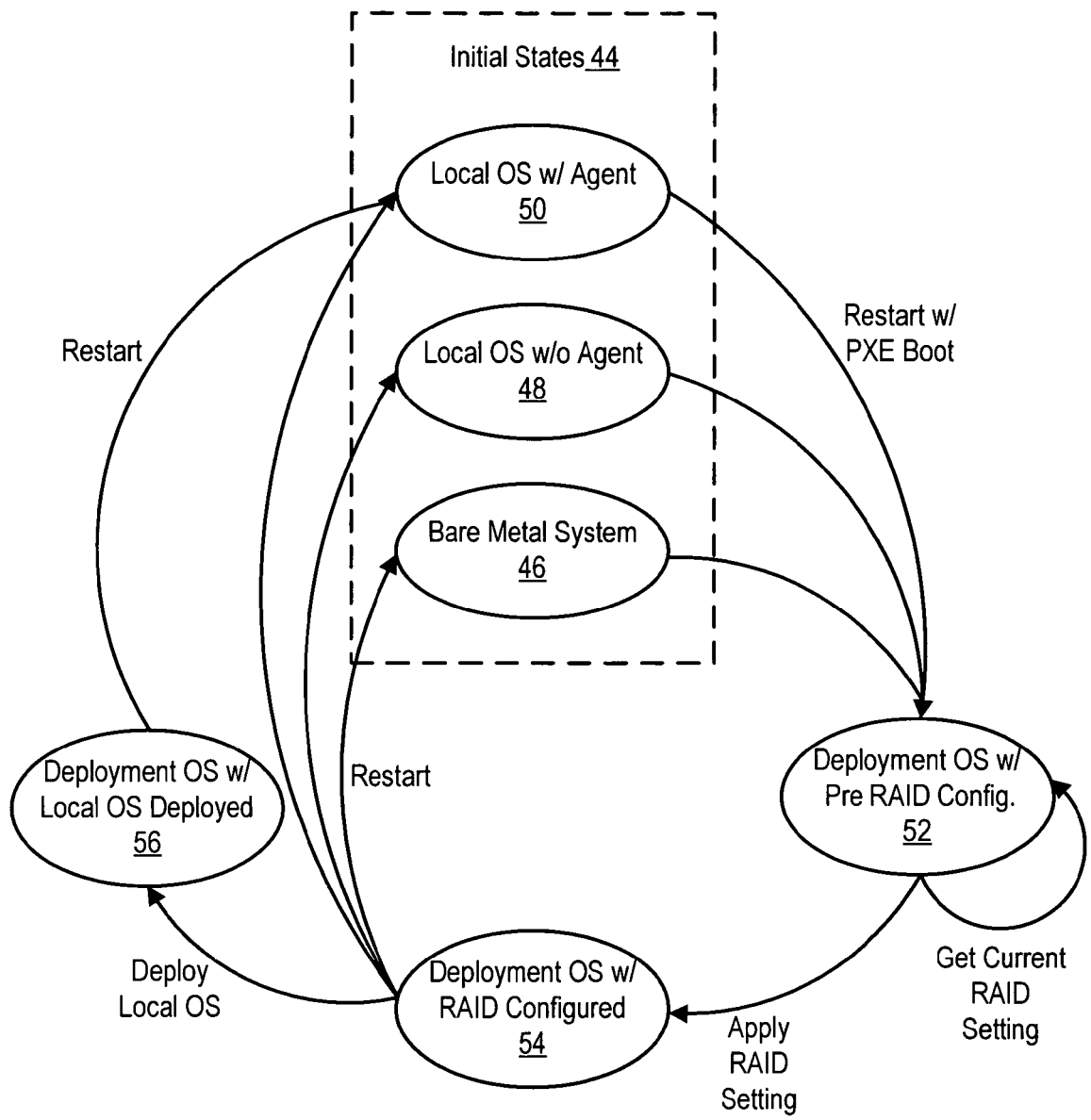
FIG. 2 depicts a state diagram of target RAID information handling system states for remote RAID configuration.

Referring now to FIG. 2, a state diagram depicts initial states 44 of target information handling systems having RAID configuration managed by RAID deployment management system 10. One initial state 46 is a "bare metal" system state in which the target system has no software deployed and thus boots at power-up to a network location determined, for instance, by a PXE client in a network interface card (NIC). A second initial state 48 is a "no agent" state in which the target system has a local operating system running without any post OS agent loaded. A third initial state 50 is an "agent" state in which the target system has a local operating system running with a post OS agent loaded. Power-up or re-start from each initial state results in a PXE boot to "pre-RAID" state 52 with the loading of a deployment operating system with pre-RAID configuration information determined by deployment engine 32 with reference to the current RAID setting taken from state label 28. Once the current RAID setting is applied, a "post-RAID" state 54 is achieved in which the deployment operating system runs on the target system with the RAID configuration information available. From state 54, the RAID configuration utility deployed to the target system performs vendor specific configuration functions that may call for a restart of the target system to one of the initial states 46–50 for repeated boots to files defined after a PXE boot and determination of the RAID settings at state 52. As RAID configuration completes, state 54 transits to state 56 by deployment of the local operating system to the target system.

Figure 3:
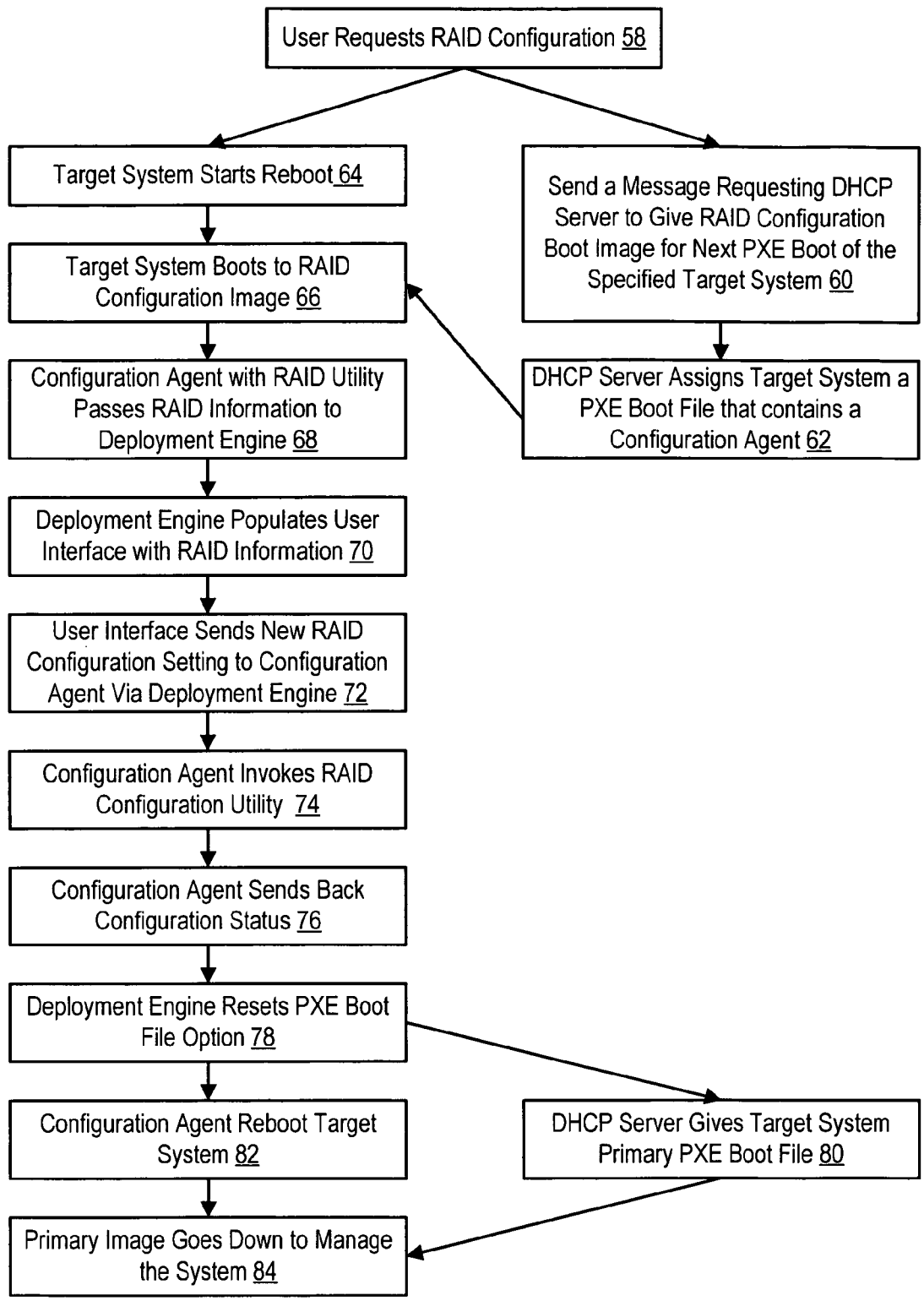
FIG. 3 depicts a flow diagram of a process for remote RAID information handling system configuration.

Referring now to FIG. 3, a flow diagram depicts a process for configuration of a RAID information handling system target. The process begins at step 58 with a request by a user for a RAID configuration through the user interface. The request for a RAID configuration results at step 60 in the sending of a message for the DHCP server to give a RAID configuration boot image associated with the target system at the next PXE boot of the target system. At step 62, the DHCP server gives the target system the selected PXE boot file that is associated with the target system and target status. The use of selected boot files allows flexibility to configure different types of RAID configurations having a variety of available vendor hardware and software implementations. Simultaneously with the designation of a PXE boot file associated with the target system at steps 60 and 62, the target system starts a reboot at step 64 and boots to the selected PXE RAID configuration boot image at step 66.

Once the target system has booted to the selected boot image, at step 68 the deployment module RAID utility passes RAID configuration information, such as RAID settings and configuration utilities, associated with the selected PXE boot file and RAID target type to the deployment engine. At step 70, the deployment engine populates the user interface with the RAID configuration information for review, if desired, by the user. The deployment module's RAID configuration utility translates vendor specific configuration information into a vendor independent format for reference by the user interface. At step 72, the user interface sends the RAID configuration information to a configuration agent loaded on the target system via the deployment engine. At step 74, the configuration agent invokes a RAID configuration utility, such as a vendor specific utility, and applies the RAID settings to perform desired configuration functions. At step 76, the configuration agent sends back the configuration status to the deployment module RAID configuration utility which translates the status into a vendor independent information. Once the vendor specific configuration utilities and settings are applied to the target, the target is configured to operate for deployment of software through a network infrastructure.

At step 78, the deployment engine resets the PXE boot file option associated with the target system to direct a subsequent boot to a state in which the RAID configuration of the target is set and software deployment may begin. At step 80, the DHCP server gives the target system a primary PXE boot file to direct loading of a primary image to the RAID-configured target. Simultaneously at step 82, the configuration agent on the target system directs a reboot. At step 84, reboot occurs with the primary PXE boot file to load a primary image on the RAID configured target to manage the target system, such as with the completion of software deployment.

Although the present invention has been described in detail, it should be understood that various changes, substitutions and alterations can be made hereto without departing from the spirit and scope of the invention as defined by the appended claims.

What is claimed is:

1. A system for Redundant Array of Inexpensive Disks ("RAID") configuration of a target information handling system having one of plural vendor-specific configurations, the system comprising:
   a RAID configuration utility operable to provide RAID configuration information to the target information handling system with a selected vendor-specific utility associated with the target information handling system;
   a Dynamic Host Configuration Protocol ("DHCP") server operable to provide at least one of a RAID configuration Preboot Execution Environment ("PXE") boot file to the target information handling system on an initial boot and a primary boot file to the target information handling system; and
   a deployment engine operable to communicate the RAID configuration information to the target information handling system after boot with the RAID configuration PXE boot file, the RAID configuration information for performing a vendor specific configuration, the deployment engine further operable to reset the DHCP server to boot the target information handling system to the primary boot file after application of the RAID configuration information.

2. The system of claim 1 wherein the RAID configuration information comprises an agent operable to run a RAID configuration utility over a deployment operating system running on the target information handling system.

3. The system of claim 1 wherein the deployment engine is further operable to determine an initial state of the target information handling system and to adjust the RAID configuration information according to the initial state.

4. The system of claim 3 wherein the deployment engine determines the initial state from a state label of the target information handling system.

5. The system of claim 1 further comprising a user interface in communication with the deployment engine and the RAID configuration utility, the user interface operable to display RAID configuration information translated by the RAID configuration utility from a vendor-specific format to a vendor independent format, the user interface further operable to command the deployment engine to populate the target information handling system with the RAID configuration utility.

6. The system of claim 5 wherein the user interface is further operable to select RAID configuration information for the target information handling system by comparing a unique identifier read from the target information handling system with a database that associates vendor-specific configurations to information handling system unique identifiers.

7. The system of claim 1 further comprising plural RAID configuration PXE boot files, each RAID configuration PXE boot file associated with a vendor-specific RAID configuration utility.

8. The system of claim 1 further comprising a post operating system agent deployable to the target information handling system and operable to command reboots of the target information handling system to trigger RAID configuration.

9. A method for RAID configuration of a target information handling system, the method comprising:
   selecting a RAID configuration for deployment to a target information handling system, the RAID configuration associated with a vendor-specific configuration utility;
   identifying one of plural RAID configuration boot files associated with a DHCP server, the identified RAID configuration boot file associated with the vendor-specific configuration utility;
   performing a PXE boot from an initial state of the target information handling system with the RAID configuration boot file to run a deployment operating system;
   deploying RAID configuration information to the target information handling system; applying the RAID configuration information to the target information handling system;
   identifying a primary boot file associated with the DHCP server; and
   performing a PXE boot with the primary boot file.

10. The system of claim 9 deploying RAID configuration information to the target information handling system further comprises:
   translating raid configuration information from a vendor-specific format to a vendor-independent format;
   displaying the translated RAID configuration information at a user interface; and
   deploying the RAID configuration information to the target information handling system with a command from the user interface.

11. The method of claim 10 further comprising:
   receiving RAID configuration status information from the target information handling system in a vendor specific format;
   translating the status information to a vendor-independent format; and
   displaying the status information at the user interface.

12. The method of claim 9 wherein deploying the RAID configuration information to the target information handling system further comprises:
   deploying a vendor-specific RAID configuration utility to the target information handling system; and
   executing the vendor-specific RAID configuration utility at the target information handling system.

13. The method of claim 9 further comprising:
   determining an initial state of the target information handling system by reading a state label from the target information handling system; and
   determining RAID settings for the target information handling system from the initial state.

14. The method of claim 9 further comprising deploying software applications to the target information handling system with a primary operating system provided by the primary boot file.

* * * * *